United States Patent [19]
Blyler, Jr. et al.

[11] Patent Number: 5,989,627
[45] Date of Patent: Nov. 23, 1999

[54] VINYL ETHER TERMINATED OLIGOMERS AND POLYMERS

[75] Inventors: Lee Landis Blyler, Jr., Basking Ridge; Mark Anthony Paczkowski, Green Township, Sussex County; Debra Ann Simoff, South Plainfield, all of N.J.; Ulrike Varlemann, Horsham, Pa.; Nanze Patrick Wang, Chatham, N.J.

[73] Assignee: Lucent Technologies Inc., Murray Hill, N.J.

[21] Appl. No.: 09/161,889

[22] Filed: Sep. 28, 1998

[51] Int. Cl.⁶ ............................. B05D 5/06; C08F 2/46; C08F 283/00
[52] U.S. Cl. .................. 427/163.2; 528/373; 528/390; 528/392; 528/393; 528/403; 525/523; 525/529; 522/2; 522/71; 522/100; 522/149; 522/178; 427/487; 427/501; 427/508; 427/516; 428/372.2; 428/385.5
[58] Field of Search ................... 528/373, 390, 528/392, 393, 403; 525/523, 529; 522/178, 149, 100, 71, 2; 427/487, 501, 508, 516, 163.2; 428/372.2, 385.5

[56] References Cited

U.S. PATENT DOCUMENTS

| | | | |
|---|---|---|---|
| 4,654,379 | 3/1987 | Lapin | 522/15 |
| 4,751,273 | 6/1988 | Lapin et al. | 525/455 |
| 4,956,198 | 9/1990 | Shama et al. | 427/54.1 |
| 4,967,015 | 10/1990 | Karcher et al. | 568/616 |
| 4,999,216 | 3/1991 | Gaske et al. | 427/44 |
| 5,139,872 | 8/1992 | Lapin et al. | 428/375 |
| 5,181,269 | 1/1993 | Patisce | 385/128 |
| 5,252,682 | 10/1993 | Bayha | 525/445 |
| 5,334,456 | 8/1994 | Noren et al. | 428/431 |
| 5,352,712 | 10/1994 | Shustack | 522/31 |
| 5,352,713 | 10/1994 | Snyder et al. | 522/40 |
| 5,596,669 | 1/1997 | Murphy et al. | 385/128 |
| 5,620,495 | 4/1997 | Aspell et al. | 65/392 |

*Primary Examiner*—Samuel A. Acquah

[57] ABSTRACT

The specification describes processes for synthesizing vinyl ether functionalized oligomers or polymers, and methods for coating optical fibers with formulations containing these oligomers or polymers. Optical fibers coated with these formulations can be highly transparent to radiation used to write optical gratings in the optical fibers.

29 Claims, 1 Drawing Sheet

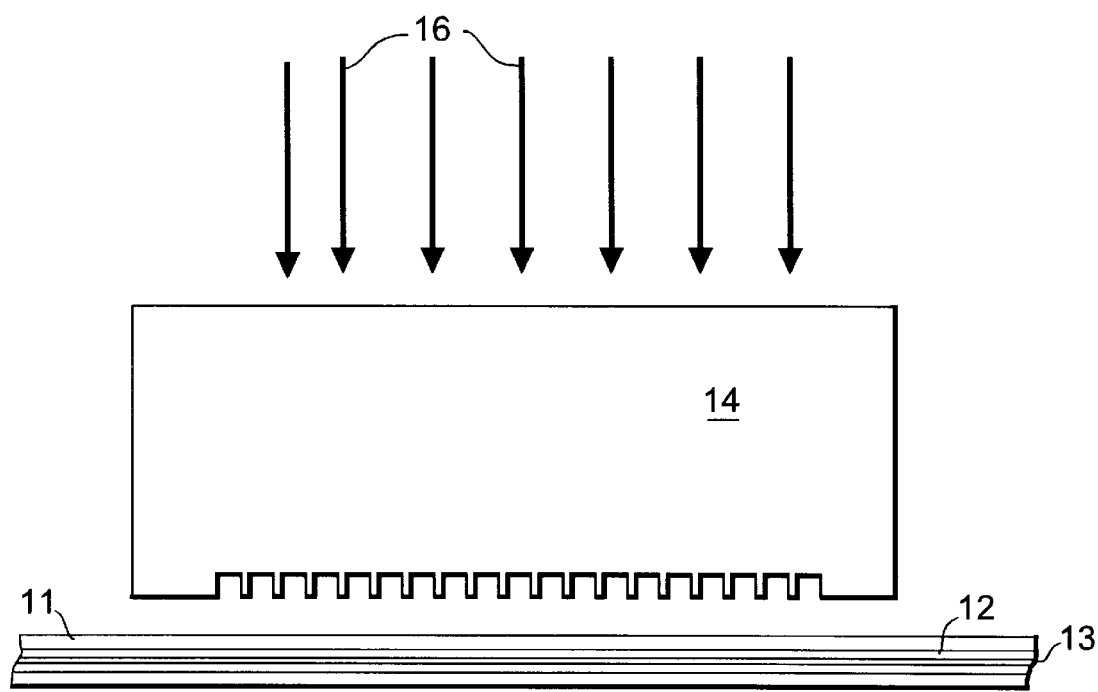

VINYL ETHER TERMINATED OLIGOMERS AND POLYMERS

FIELD OF THE INVENTION

This invention relates to methods for preparing vinyl ether oligomers and polymers which are adapted for coating optical fibers. These oligomers and polymers may also have applications as photocurable materials in photolithography, holography, optical disks, waveguides and microelectronics.

BACKGROUND OF THE INVENTION

Vinyl ethers represent a relatively new class of chemistry for preparing photopolymerizable coatings. See for example, J. V. Crivello, J. L. Lee, and D. A. Conlon, Radcure VI Conf. Proc., p. 4–28, Soc. Manuf. Eng., Dearborn, Mich. (1982). The general vinyl ether structure is represented as:

where R may comprise various types of chemical groups, typically aliphatic or aromatic hydrocarbons. R may include moieties such as ester, urethane, ether, ketone, etc., and/or may comprise siloxanes or fluorocarbons, and there may be more than one vinyl ether group per molecule.

Vinyl ethers can be polymerized by ultraviolet (UV) radiation using either cationic or free radical photoinitiators. When cured cationically, vinyl ethers provide an advantage in increased cure speed over both cationically cured epoxies and free radically cured acrylates. This is related to the electron rich nature of the C=C double bond in the vinyl ether moiety. In addition, cationic curing of vinyl ethers is not subject to oxygen inhibition as is free radical cure of acrylates, where cure speed decreases in the absence of inert gas blanketing. When cured free radically, vinyl ethers do not homopolymerize well, but may be copolymerized with other components such as acrylates or unsaturated esters. See J. R. Snyder et al, "Free-radical Co-polymerization of Acrylates and Vinyl Ethers", U.S. Pat. No. 5,352,713; J. Gaske et al, "Method of Coating Concrete Floors With Photocurable Coatings", U.S. Pat. No. 4,999,216; G. K. Noren et al, "Free-radical Curable Compositions", U.S. Pat. No. 5,334,456. Curing in such hybrid systems may also be carried out by simultaneous free radical and cationic photo polymerization. An anticipated advantage of most vinyl ethers over acrylates is a lower level of skin sensitization. A further benefit of vinyl ethers is increased UV transparency, especially for applications in which optical fiber gratings are written into fiber cores with laser radiation through the optical fiber coating. See J. Aspell, D. Inniss, V. J. Kuck, M. A. Paczkowski, D. A. Simoff, "Formation of Gratings in Polymer Coated Optical Fibers", U.S. Pat. No. 5,620,495. A still further potential benefit of cationically cured fiber coating systems is enhanced corrosion resistance and mechanical strength resulting from an acidic environment. See J. R. Petisce, "Optical Fiber Including Acidic Coating System", U.S. Pat. No. 5,181,269.

Many UV curable coatings contain at least one oligomer component, together with one or more reactive monomer(s) and photoinitiator(s). An increasing variety of vinyl ether monomers are commercially available. Typical synthesis methods proceed via acetylene chemistry, dehydrohalogenation, cracking of acetals, and catalytic transvinylation. See for example, J. W. Reppe, *Acetylene Chemistry*, Charles A. Meyer, New York (1949); D. H. Lorenz and N. B. Bikales, *Encycl. Polym. Sci.*, Wiley-Interscience, New York (1964); Matzher, Kurkjy and Cotter, *Chem. Rev.*, 64, 645 (1964); C. Y. Yang, Ph. D. Thesis, 1991, Rennselear Polytechnic Institute, Troy, N.Y. 12180; M. Dimonie, Teodorscu, *Makromol. Chem. Rapid. Commun.*, 14, 303 (1993); S. -S. Thang, Q. -G Liu and L. -L. Yang, *J. Polym. Sci., Part A Polym. Chem.*, 31, 2313 (1983); J. V. Crivello, K. -D Jo, *J. Polym Sci., Part A*, 31, 1473 (1993); J. E. McKeon et al, *Tetrahedron*, 28 223 (1972); M. A. Smith et al, *Polymer Reprints*, 28(2), 264 (1987). Presently, only a few vinyl ether functional oligomers are commercially available. These typically contain urethane and/or ester groups which are undesirable for some applications. See S. C. Lapin, *RadTech '88 Conf. Proc.*, p. 395, RadTech International, Northbrook, Ill. (1988); S. C. Lapin et al, "Vinyl Ether Terminated Urethane Resins", U.S. Pat. No. 4,751,273. Urethane and ester groups absorb UV light which is detrimental for coatings designed for UV transparency. A further disadvantage of ester and urethane groups is that they tend to decrease cure speed in cationically cured systems, limiting the inherent potential of vinyl ethers for rapid cure. To compensate for the impedance of cure speed by these constituent groups the concentration of the photoinitiator may be increased. However, this adds cost, and is detrimental to UV transparency of the coating because photoinitiators are UV absorbent by design.

Oligomers or polymers that are not vinyl ether functionalized have been used in formulations with vinyl ether monomers. Such oligomers/polymers have included non-reactive resin fillers such as cellulose derivatives or poly (alkyl methacrylates). See S. C. Lapin, "Semi-interpenetrating Polymer Networks", U.S. Pat. No. 4,654,379; E. J. Murphy et al, "Radiation Curable Coating Composition and Coated Optical Fiber", U.S. Pat. No. 5,596,669. Other additives of the prior art are reactive acrylate-functional oligomers, unsaturated polyester oligomers, or epoxy-functional oligomers. See for example C. E. Bayha, "Cationically Initiated Curable Resin System, U.S. Pat. No. 5,252,682; J. A. Dougherty et al, "Vinyl Ethers for Cationic UV Curing", *Radcure '86 Conf. Proc.*, 15-1, *Soc. Manuf. Eng.*, Dearborn, Mich. (1986); J. A. Dougherty et al, "Triethylene Glycol Divinyl Ether as a Reactive Diluent for Cationic Curing", *Radcure Europe '87 Conf. Proc.*, 5-1, *Soc. Manuf. Eng.*, Dearborn, Mich. (1987). Many of these oligomers/polymers contain urethane and/or ester groups, with attendant disadvantages in UV transparency and cure speed. The epoxy-functional oligomers that are commercially available (e.g., the diglycidyl ether of Bisphenol A or its derivatives) often contain aromatic groups which are unacceptable for UV transparency and also increase the tendency toward yellowing. In general, the commercially available cycloaliphatic (non-aromatic) epoxies do not have sufficiently high molecular weight to provide adequate viscosity for optical fiber coating applications.

Earlier patents for vinyl ether based optical fiber coatings tend to rely on oligomers that contain ester and/or urethane groups. For example, U.S. Pat. No. 4,956,198 discloses vinyl ether functional oligomers having aromatic urethane moieties. U.S. Pat. No. 5,139,872 discloses vinyl ether based coatings for optical fibers wherein the oligomer is a vinyl ether urethane having a polyester or polyether backbone. U.S. Pat. No. 5,352,712 discloses hydrocarbon polyol based aliphatic vinyl ether urethane oligomers for use in optical fiber coatings.

Aliphatic polyether and aliphatic hydrocarbon based oligomers have long been used in fiber optic coatings, where oligomers having such backbones provide a combination of desirable properties including flexibility, low glass transition temperatures, and resistance to hydrolysis. A particularly desirable backbone is polytetrahydrofuran, which has superior hydrophobicity compared to other polyethers such as polyethylene oxide and polypropylene oxide, and has superior oil resistance as compared with saturated hydrocarbon backbones. Polytetrahydrofuran also has excellent UV transparency at wavelengths above about 240 nm, where it is desirable to be able to write optical fiber gratings through the polymer coating. Polytetrahydrofuran is also known by other names, e.g., poly(tetramethylene oxide), polybutanediol, poly(butylene glycol), and α-hydroxy-ω-hydroxy poly(oxy-1,4-butanediyl).

The term oligomer as used herein, and generally as used in the art, refers to relatively low molecular weight materials, e.g. with molecular weights in the approximate range 500–5000. The distinction between oligomer to polymer in the art is not well defined but the range given is suitable for this description.

A technique for preparing polytetrahydrofuran (PTHF) vinyl ethers is described in U.S. Pat. No. 4,967,015. This process reacts polybutanediol with acetylene in the presence of a strong base. However, in commercial practice this process has been limited to synthesis of relatively low molecular weight oligomers, which have viscosities that are too low for commercial optical fiber coating techniques.

It would represent a substantial contribution to the technology if high molecular weight vinyl ether functionalized oligomers or polymers became available which are substantially devoid of aromatic moieties, carbonyl groups and nitrogen, i.e. species that are detrimental to both UV transparency and fiber coating cationic cure speed. Desirable types of oligomer or polymer backbones that meet these requirements include aliphatic polyethers, cycloaliphatic polyethers, aliphatic hydrocarbons, cycloaliphatic hydrocarbons, and their copolymers and mixtures. Other desirable backbones include aliphatic or cycloaliphatic hydrocarbon or polyether polyols that have been chain extended with aliphatic or cycloaliphatic di- or multifunctional epoxides. The availability of high molecular weight polytetrahydrofuran based vinyl ether functional oligomers would be of special interest in optical fiber coating technology.

SUMMARY OF THE INVENTION

Mono-, di-, and multi-functional vinyl ether terminated polymers and oligomers that are substantially devoid of urethane and ester groups have been synthesized by activating the hydroxyl terminations of polyols with sulfonate moieties to form leaving groups, and displacing the leaving groups with vinyl ether moieties. In the preferred embodiment, an oligomeric diol of polytetrahydrofuran is first chain extended with a non-aromatic diepoxide to a molecular weight of greater than 10,000, and then some or all of the resultant hydroxyl groups are converted to sulfonate leaving groups. The sulfonate groups on the oligomer are then converted to vinyl ether functionalities by a substitution reaction. In an alternative embodiment, a vinyl ether of polytetrahydrofuran (PTHF) is produced by carrying out a bifunctional living polymerization of tetrahydrofuran. Polymerization proceeds rapidly from both ends forming very long polymer chains. When the desired molecular weight is reached, the leaving groups at the ends are replaced with vinyl ether groups.

Molecular weights are given as peak molecular weights unless otherwise indicated to be number average molecular weights. The number average molecular weight is the weight w of all the molecules in a polymer sample divided by the total number of molecules present, defined by:

$$M_n = \frac{w}{\sum_i N_i} = \frac{\sum_i M_i N_i}{\sum_i N_i}$$

where there are $N_i$ molecules of molecular weight $M_i$ for each molecular species i.

The vinyl ether terminated oligomers or polymers produced according to the invention are particularly suited for use in coating optical fibers. A particular aspect of the invention is the use of these oligomers or polymers in coatings for optical fibers in which optical gratings are produced by writing the gratings through the optical fiber coating. The vinyl ether terminated materials of the invention can be incorporated in a coating formulation and cured by UV radiation in a conventional fiber draw operation. They also allow substantial UV transparency for the actinic radiation used to form fiber gratings.

BRIEF DESCRIPTION OF THE DRAWING

The FIGURE is a schematic representation of the process for forming gratings in the core of an optical fiber.

DETAILED DESCRIPTION

The basic reaction to produce the vinyl ether terminated oligomers and polymers according to the invention is characterized by:

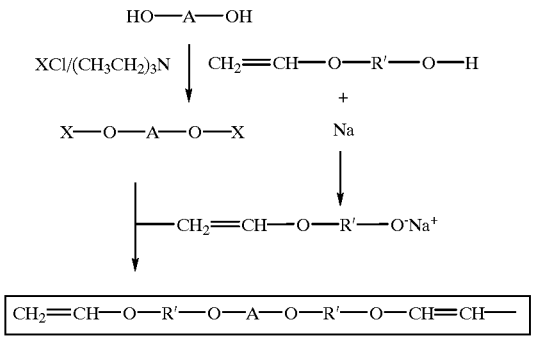

where A is a saturated hydrocarbon moiety that may contain oxygen heteroatoms and is devoid of urethane, ketone, ester and aromatic groups or substituents, R' is a hydrocarbon based alkyl or cycloalkyl moiety containing up to 12 carbon atoms and preferably 3–5 carbon atoms, and X is selected from the group consisting of toluene sulfonyl, methyl sulfonyl, and trifluoromethyl sulfonyl. Other good leaving groups may be used by those skilled in the art. Further, sulfonyl anhydrides, X—O—X, may be used in place of the corresponding sulfonyl chlorides, XCl. Bromide, XBr, and iodide, XI, reactants may also be used in place of the chlorides. Sodium (Na) is shown as the reactant for ionizing the hydroxyl groups of the vinyl ether, $CH_2$=CH—OR'—OH, the reaction above but is representative of the group consisting of Na, Li, and K.

The polyol is defined as a molecule containing two or more hydroxyl groups. The term is used to describe both low molecular weight hydroxy functional compounds carrying two hydroxyls (diols, or glycols such as ethylene glycol and 1,4 butane diol) and polymeric molecules with hydroxyl end groups. The latter are typically available commercially as the prepolymers, usually of a molecular weight of a few thousand, which by reaction with a diisocyanate can be used to form a polyurethane.

For the purposes of this invention the polyol is preferably polytetrahydrofuran, i.e. HO—[CH$_2$—CH$_2$—CH$_2$—CH$_2$—O]$_n$—H. Also among preferred polyols are polyethylene oxide (polyethylene glycol), polypropylene oxide (polypropylene glycol), and polymers with mixed chains such as hydroxyl-terminated poly(ethylene/butylene).

To obtain the desired molecular weight for A, a chain extending reaction can be used according to principles known in the art. For example, the polyol can be reacted with a diglycidyl ether. A representative reaction is:

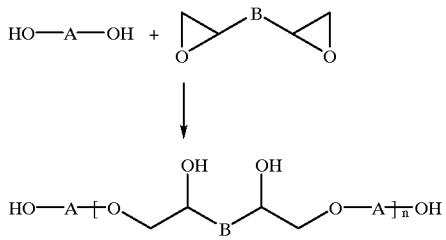

where B in the diglycidyl ether can be selected from a variety of known moieties such as neopentyl glycol, hydrogenated Bisphenol A, cyclohexyl dimethanol, and butane diol.

An alternative synthesis according to the invention begins with a tetrahydrofuran ring structure which is opened with a cationic initiator, and the ends of the opened structure are terminated with this cationic initiator. Trifluoromethane sulfonic anhydride (triflic anhydride) is especially effective in the process but as indicated above, other cationic initiators can be used to activate one or both ends of the open ring. With the ring opened and the ring end(s) functionalized, polymerization proceeds in a living fashion at the initial stage of polymerization, propagating from the activated end(s) of the growing chain. In this way the PTHF may be polymerized to unusually high molecular weights. When the desired chain length is reached the functional sulfonate leaving groups are replaced with vinyl ether alkoxide groups to produce the vinyl ether terminated oligomers or polymers. The vinyl ether alkoxides may be derived from various hydroxy-functional alkyl vinyl ethers, for example: 4-hydroxybutyl vinyl ether, 4-hydroxymethyl cyclohexyl vinyl ether, 2-hydroxyethyl vinyl ether, triethylene glycol mono vinyl ether, and diethyleneglycol mono vinyl ether.

The chain length can be controlled in known fashion by adjusting the THF/initiator ratio and the reaction conditions. The preferred synthesis technique is represented by:

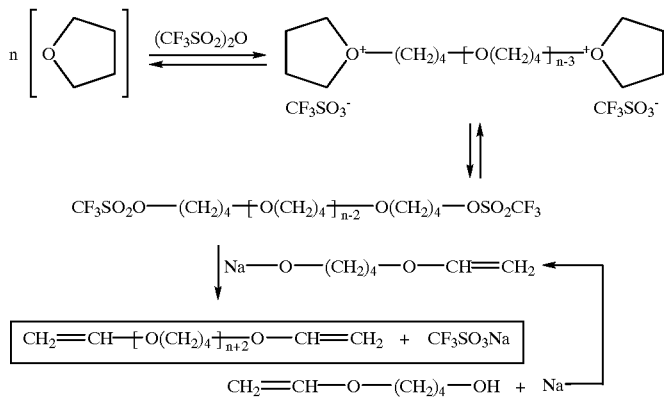

The production of vinyl ether terminated oligomers by the above described methods is demonstrated in the following examples.

EXAMPLE I 145 g (0.05 mole) of polytetrahydrofuran diol having a number average molecular weight of ~2900 and 21 ml (0.15 mole) of triethylamine were dissolved in ethylene glycol dimethyl ether (EGDME). 8.5 ml (0.11 mole) of methane sulfonyl chloride (CH$_3$SO$_2$Cl) were slowly added to the solution. The mixture was stirred for an additional 20 minutes, and then the precipitate (triethylamine hydrochloride) was filtered out. To the resulting mesylate solution, 170 ml (1.3 mole) of hydroxybutylvinyl ether (HBVE: CH$_2$=CHOCH$_2$CH$_2$CH$_2$CH$_2$OH) and 3.45 gm (0.15 mole) of sodium (Na) were added. The mixture was heated in an oil bath to 80° C. with mechanical stirring for 4 hr, after which Fourier Transform Infrared Spectroscopy (FTIR) showed complete conversion of the mesylate to vinyl ether. The mixture was allowed to cool and then poured into ice-water with vigorous stirring. The solid was collected and purified by dissolving in tetrahydrofuran (THF) and then reprecipitating in ice water. 147 gm of vinyl ether functionalized PTHF were obtained, representing a 95% yield. The number average molecular weight of the polymer was nominally ~3100.

EXAMPLE II 145 gm (0.05 mole) of polytetrahydrofuran having a number average molecular weight of ~2900 was heated to melt at 70° C. With mechanical stirring, 0.5 ml of boron trifluoridediethyl etherate was added, and then 15 gm of neopentyl glycol diglycidyl ether (NPGDE) were slowly added over a period of 30 min. The viscosity of the mixture increased with the addition of NPGDE. The mixture was allowed to cool 20 min. after adding all NPGDE. The resulting high molecular weight chain extended polymer was dissolved in 500 ml of EGDME and then 21 ml (0.15 mole) of triethylamine were added. 9.3 ml (0.12 mole) of CH$_3$SO$_2$Cl were slowly added. The white precipitate was removed by filtration. To the resulting mesylate solution, 250 ml of HBVE and 3.5 gm (0.15 mole) of sodium were added. The mixture was then heated at 65° C. with stirring for 4 hr. The mixture was allowed to cool and then precipitated in cold water (0–5° C., cooled with dry ice). High molecular weight vinyl ether functionalized polymer was obtained. Molecular weight analysis of this polymer by gel permeation chromatography using PTHF calibration standards showed a peak molecular weight of 11,320, and a number average molecular weight of 7400.

EXAMPLE III

PTHF divinyl ether oligomer was prepared as follows:

1.00 g fresh distilled hydroxybutylvinyl ether (HBVE), 10 ml dried tetrahydrofuran (THF), and 0.29 g Na pellets, were added into a 100 ml flame dried, argon purged, three-necked, round bottom flask. The reaction was stirred under argon overnight to obtain a yellow solution of the sodium salt of hydroxybutylvinyl ether, NaOBVE. 50 ml of dried and inhibitor free THF were placed into a 250 ml $N_2$ purged round bottom flask. 0.1687 g triflic anhydride was added and allowed to react for 5 min. prior to addition of the NaOBVE solution. The solution turned yellow during the addition and was stirred an additional 1 hr under argon. The solvent was removed under high vacuum and the residue was poured into 5° C. cold distilled water. The precipitated white polymer was filtered off and dried under vacuum twice to remove traces of water, solvent, and HBVE. The final colorless, waxy product was characterized by $^1$H-NMR and $^{13}$C-NMR spectroscopy, indicating complete conversion to the vinyl ether functionalized polytetrahydrofuran.

EXAMPLE IV

Three additional vinyl ether functionalized oligomers were prepared using a procedure similar to that described in Example III, but having higher molecular weights. The molecular weight was increased by increasing the THF polymerization periods from 5 min. in Example III to 15 min., 26 min., and 35 min., respectively.

A preferred use of the oligomers and polymers described above is as precursor materials for optical fiber coatings. Manufacturing techniques for commercial fibers involve drawing the glass fiber from a glass preform and coating the fiber with a liquid polymer immediately after drawing. This sequence is essential due to the fragility of uncoated fibers. The liquid polymer must be cured or otherwise solidified very rapidly to allow the fiber to be drawn and reeled at a workable and commercially attractive draw speed. The cure mechanism predominantly used in commercial practice is UV induced polymerization. This mechanism involves use of a coating composition that polymerizes by free radical or cationic initiators. Free radical photoinitiators are described in U.S. patent application Ser. No. 08/720,253, filed Sep. 26, 1996. Cationic initiators are described in J. V. Crivello, *Advances in Polymer Sci.,* 64, pp. 1–48 (1984). To facilitate rapid curing UV sensitive polymer coating compositions have been carefully engineered to optimize the effectiveness of the photoinitiation process.

In a preferred embodiment of the invention the oligomers or polymers described above are used in formulations for coating optical fibers. Optical fibers coated with materials containing these oligomers or polymers are especially adapted for the manufacture of optical gratings formed in the core of the optical fibers.

Optical gratings formed in the core of optical fibers have been proposed for a variety of uses and have become important optical components for designers of lightwave systems and devices. Applications include such devices as semiconductor laser stabilizers and pump reflectors, cavity resonators for fiber lasers, dispersion compensators, filters for add/drop signal control, optical amplifier gain equalizing filters, and strain sensors for architectural structures.

Optical gratings useful in such applications are typically produced by photoinducing refractive index changes in the core of an appropriately sensitized glass fiber. The desired grating pattern is formed by using actinic radiation (typically an excimer laser-pumped frequency doubled dye laser operating near 240 nm) with a varying intensity or periodicity along the length of the fiber. This is conveniently done using a photomask, or by using a patterned light beam produced, e.g., by an interference pattern. The refractive index changes are produced typically by UV induced changes at defect sites of an absorbing ion such as germanium. The germanium doped fiber may be sensitized by hydrogen or deuterium treatments known in the art. Very large (>0.01) refractive index changes can be obtained in such a process. These techniques for forming optical gratings are well known in the art and are described in e.g. U.S. Pat. No. 4,725,110, issued Feb. 16, 1988 and U.S. Pat. No. 5,327,515, issued Jul. 5, 1994, both of which are incorporated herein by reference.

While the photochemical process for forming these optical gratings is very effective, it usually requires the removal of the polymer coating from the fiber so as to allow the actinic light (UV) to reach the core with sufficient intensity to effect the desired transition. The coating may be stripped from the grating region by various means, e.g. by dissolving the polymer in sulfuric acid. After the grating is formed the portion of the fiber from which the coating was stripped must be recoated or otherwise mechanically protected from abrasion. The processing required to remove and later replace the fiber coating has proved to add more than 50% to the cost of manufacturing the grating. Moreover, stripping and recoating the fiber reduces yield due to mechanical strength test failures. It is important to find effective manufacturing techniques that avoid the cumbersome and costly operations just described.

Attempts have been made to form the grating by exposing bare glass fiber to UV patterns during the draw operation but these have met with limited success.

An approach to simplifying fiber grating forming that shows considerable promise is described and claimed in U.S. Pat. No. 5,773,486. The process described in that application involves exposing the fiber to the actinic radiation through the polymer fiber coating. That expedient eliminates the cumbersome steps of removing the fiber coating in the vicinity of the grating and reapplying coating material after the grating is formed. Following this teaching, the polymer coating must be substantially transparent to the UV radiation used to form the grating. Typically this radiation is in the band 235 to 260 nm. The vinyl ether terminated materials described above meet this requirement.

Referring to the FIGURE, an optical fiber is shown with polymer coating 11, cladding 12, and core 13. The coating may comprise more than one layer, but a single layer is preferred. A UV laser source represented by arrows 16 is shown incident on an $SiO_2$ phase mask 14. UV radiation is diffracted into a light pattern of fine lines by the phase mask and is incident on the fiber core 13 after passing through the polymer coating 11 and the cladding layer 12. More details on this process can be found in U.S. Pat. No. 5,620,495.

The preferred UV source for forming the grating is an excimer laser-pumped frequency doubled dye laser operating at a wavelength around 240 nm, although other sources may be employed. In general, to be effective in forming the desired refractive index changes, the radiation should be in the band 235–260 nm. By contrast the typical UV radiation used to cure polymer coatings in commercial fiber drawing operations is at or near 360 nm. Most commercial polymer coating materials are formulated to maximize UV absorption by the curing radiation (250–400nm). These materials absorb strongly throughout much of the UV band and have enough absorption in the 235–260 nm range that gratings cannot be written through them without substantial damage to the coating itself. The optical fiber coating material according to the invention is essentially transparent, when used with appropriate initiators, to radiation used to write gratings.

It is likely in commercial practice that the vinyl ether terminated oligomers and polymers described here will be used as a constituent of an optical fiber formulation. The higher molecular weight oligomers or polymers are effective for increasing the viscosity of the coating formulation. It is expected to that the vinyl ether functionalized oligomers will comprise at least 10% by weight, and more likely at least 30%, of the coating formulation.

It will be apparent to those skilled in the art that the invention described herein is most useful with optical fibers that are manufactured by drawing a glass fiber from a glass preform, coating the fiber with a UV curable resin, and curing the coated fiber by exposure to UV radiation. As mentioned earlier it is also especially applicable to coating materials that are devoid of conjugated or unsaturated compounds, e.g. aromatic compounds, in the cured resin.

The term hydrocarbon based moiety as used herein and in the appended claims is intended to refer to moieties with a substantially saturated hydrocarbon chain which may contain oxygen heteroatoms.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. A process for preparing a vinyl ether functionalized oligomer or polymer comprising the steps of reacting:

a. a polyol containing the grouping:

R—[OH]$_x$ where R comprises a hydrocarbon based moiety devoid of aromatic, ketone, urethane and ester groups, and x is at least 2, and b. a reactant having the formula:

ACl where A is selected from the group consisting of toluenesulfonyl, methylsulfonyl, and trimethylsulfonyl,
   reacting the reaction product of a. and b. with c. a vinyloxyalkoxide having the formula:

CH$_2$=CHR'O$^-$ where R' is a hydrocarbon based moiety of fewer than 12 carbon atoms thereby producing a vinyl ether functionalized oligomer.

2. The process of claim 1 in which reactant c. is produced by reacting CH$_2$=CHR'OH with an alkali metal selected from the group consisting of Na, K, and Li.

3. The process of claim 1 wherein R is selected from the group consisting of aliphatic polyether, cycloaliphatic polyether, saturated hydrocarbon homopolymer, saturated hydrocarbon copolymer, and mixtures thereof.

4. The process of claim 3 wherein reactant a. comprises polytetrahydrofuran diol.

5. The process of claim 4 wherein the polytetrahydrofuran diol has a number average molecular weight of at least 2900.

6. The process of claim 1 in which reactant a. is prepared by reacting said polyol with a chain extender selected from the group consisting of aliphatic diepoxide, cylcoaliphatic diepoxide, multifunctional aliphatic epoxide, and multifunctional cycloaliphatic epoxide.

7. The process of claim 6 wherein the polyol is polytetrahydrofuran diol and the aliphatic diepoxide is neopentylglycol diglicydyl ether.

8. The process of claim 7 in which the molecular weight of the chain extended polyol is at least 10,000.

9. The process of claim 1 in which R' is an alkyl or cycloalkyl moiety containing up to 12 carbon atoms.

10. The process of claim 9 wherein R' is butyl.

11. A process for preparing a vinyl ether functionalized oligomer comprising the steps of reacting:

a. HO—(—CH$_2$CH$_2$CH$_2$CH$_2$O—)$_n$—H
   where n is an integer sufficient to yield a number average molecular weight of at least 2900, b. a reactant having the formula:

ACl where A is selected from the group consisting of toluenesulfonyl, methylsulfonyl, and trimethylsulfonyl,
   reacting the reaction product of a. and b. with c. a vinyloxyalkoxide having the formula:

CH$_2$=CHRO$^-$ where R is a hydrocarbon based moiety of fewer than 12 carbon atoms, thereby producing a vinyl ether functionalized oligomer.

12. The process of claim 11 in which R is —(CH$_2$)$_4$— and the vinyloxyalkoxide is produced by reacting CH$_2$=CHO(CH$_2$)$_4$OH with an alkali metal selected from the group consisting of Na, K, and Li.

13. The process of claim 12 wherein the polytetrahydrofuran diol has a number average molecular weight of at least 10,000.

14. A method for the manufacture of optical fibers comprising the steps of:

a. reacting:
   i. an oligomeric or polymeric polyol having the formula:

R—[OH]$_x$ where R comprises a hydrocarbon based moiety and is devoid of aromatic, ketone, urethane and ester groups, and ii a reactant having the formula:

ACl where A is selected from the group consisting of toluenesulfonyl, methylsulfonyl, and trimethylsulfonyl,
   reacting the reaction product of a. with b. a vinyloxyalkoxide having the formula:

$$CH_2=CHOR'O^-$$

where R' is a hydrocarbon based moiety of fewer than 12 carbon atoms, thereby producing a vinyl ether functionalized oligomer or polymer, c. coating an optical fiber with a coating material containing a substantial amount of said vinyl ether functionalized oligomer or polymer, and d. curing said coating material to produce a coated optical fiber.

15. The method of claim 14 including the additional step of directing laser radiation through the coating on the coated optical fiber to produce an optical grating in the optical fiber.

16. The method of claim 15 wherein the said vinyl ether functionalized oligomer or polymer comprises at least 30% by weight of said coating material.

17. A process for preparing a vinyl ether functionalized oligomer or polymer comprising the steps of:

a. reacting tetrahydrofuran with an acid anhydride by ring opening cationic living polymerization, b. reacting the product of step a. with a vinyloxyalkoxide having the formula:

$$CH_2=CHORO^-$$

where R is an organic moiety of fewer than 12 carbon atoms, thereby producing a vinyl ether functionalized oligomer or polymer.

18. The process of claim 17 in which the vinyloxyalkoxide is produced by reacting $CH_2=CHOROH$ with an alkali metal selected from the group consisting of Li, Na and K.

19. The process of claim 17 in which the acid anhydride is selected from the group consisting of triflic anhydride, p-toluenesulfonic anhydride, and methanesulfonic anhydride.

20. The process of claim 17 wherein the vinyl ether functionalized oligomer or polymer has a number average molecular weight of at least 2900.

21. The process of claim 17 wherein the vinyl ether functionalized oligomer or polymer has a number average molecular weight of at least 10,000.

22. The process of claim 17 wherein R is an alkyl or cycloalkyl moiety containing up to 12 carbon atoms.

23. The process of claim 22 wherein R is butyl.

24. A process for preparing a vinyl ether functionalized oligomer or polymer comprising the steps of:

a. reacting tetrahydrofuran with triflic anhydride to yield a polymer having a number average molecular weight of at least 2900, b. reacting the product of step a. with a vinyloxyalkoxide having the formula:

$$CH_2=CHORO^-$$

where R is an organic moiety of fewer than 12 carbon atoms, thereby producing a vinyl ether functionalized oligomer or polymer.

25. The process of claim 24 in which R is $-(CH_2)_4-$ and the vinyloxyalkoxide is produced by reacting $CH_2=CHOROH$ with an alkali metal selected from the group consisting of Li, Na and K.

26. The process of claim 25 wherein the vinyl ether functionalized oligomer or polymer has a number average molecular weight of at least 10,000.

27. A method for the manufacture of optical fibers comprising the steps of:

a. reacting tetrahydrofuran with an acid anhydride by ring opening cationic living polymerization, b. reacting the product of step a. with a vinyloxyalkoxide having the formula:

$$CH_2=CHORO^-$$

where R is an organic moiety of fewer than 12 carbon atoms, thereby producing a vinyl ether functionalized oligomer or polymer, c. coating an optical fiber with a coating material containing a substantial amount of said vinyl ether functionalized oligomer or polymer, and d. curing said coating material to produce a coated optical fiber.

28. The method of claim 27 including the additional step of directing laser radiation through the coating on the coated optical fiber to produce an optical grating in the optical fiber.

29. The method of claim 28 wherein the said vinyl ether functionalized oligomer or polymer comprises at least 30% by weight of said coating material.

* * * * *